United States Patent [19]

Suda

[11] Patent Number: 6,097,894
[45] Date of Patent: Aug. 1, 2000

[54] OPTICAL APPARATUS AND CAMERA CAPABLE OF LINE OF SIGHT DETECTION

[75] Inventor: Yasuo Suda, Yokohama, Japan

[73] Assignee: Canon Kabushiki Kaisha, Tokyo, Japan

[21] Appl. No.: 09/316,025

[22] Filed: May 21, 1999

[30] Foreign Application Priority Data

May 26, 1998 [JP] Japan ................................ 10-159980

[51] Int. Cl.⁷ ........................... G03B 13/36; G03B 17/00
[52] U.S. Cl. ........................ 396/51; 396/121; 396/147
[58] Field of Search .......................... 396/51, 121, 147; 250/201.2, 221; 351/210

[56] References Cited

U.S. PATENT DOCUMENTS

| | | | |
|---|---|---|---|
| 4,555,169 | 11/1985 | Suda et al. | 354/407 |
| 4,618,236 | 10/1986 | Akashi et al. | 354/406 |
| 4,634,255 | 1/1987 | Suda et al. | 354/406 |
| 4,643,557 | 2/1987 | Ishizaki et al. | 354/406 |
| 4,670,645 | 6/1987 | Ohtaka et al. | 250/201 |
| 4,688,920 | 8/1987 | Suda et al. | 354/406 |
| 4,709,138 | 11/1987 | Suda et al. | 250/201 |
| 4,716,282 | 12/1987 | Akashi et al. | 250/201 |
| 4,728,785 | 3/1988 | Ohnuki et al. | 250/201 |
| 4,739,157 | 4/1988 | Akashi et al. | 250/201 |
| 4,774,539 | 9/1988 | Suda et al. | 354/406 |
| 4,792,668 | 12/1988 | Akashi et al. | 250/201 |
| 4,792,669 | 12/1988 | Ohnuki et al. | 250/201 |
| 4,800,410 | 1/1989 | Akashi et al. | 354/408 |
| 4,812,869 | 3/1989 | Akashi et al. | 354/408 |
| 4,825,239 | 4/1989 | Suda et al. | 354/402 |
| 4,833,313 | 5/1989 | Akashi et al. | 250/201 |
| 4,855,777 | 8/1989 | Suda et al. | 354/402 |
| 4,859,842 | 8/1989 | Suda et al. | 250/201 |
| 4,878,078 | 10/1989 | Koyama et al. | 354/402 |
| 4,908,645 | 3/1990 | Higashihara et al. | 354/402 |
| 4,954,701 | 9/1990 | Suzuki et al. | 250/201.8 |
| 4,959,677 | 9/1990 | Suda et al. | 354/402 |
| 4,963,912 | 10/1990 | Suda et al. | 354/404 |
| 4,992,817 | 2/1991 | Aoyama et al. | 354/403 |
| 4,992,819 | 2/1991 | Ohtaka et al. | 354/408 |
| 5,005,041 | 4/1991 | Suda et al. | 354/407 |
| 5,091,742 | 2/1992 | Fukahori et al. | 354/402 |
| 5,258,804 | 11/1993 | Suda | 354/406 |
| 5,367,153 | 11/1994 | Suda et al. | 250/201.8 |
| 5,440,367 | 8/1995 | Suda | 354/402 |
| 5,473,403 | 12/1995 | Suda et al. | 354/409 |
| 5,678,097 | 10/1997 | Suda | 396/113 |
| 5,771,413 | 6/1998 | Suda et al. | 396/114 |
| 5,839,001 | 11/1998 | Ohtaka et al. | 396/114 |
| 5,864,721 | 1/1999 | Suda et al. | 396/114 |
| 6,014,524 | 1/2000 | Suzuki et al. | 396/51 |

FOREIGN PATENT DOCUMENTS

| | | |
|---|---|---|
| 2-32312 | 2/1990 | Japan . |
| 6-294930 | 10/1994 | Japan . |
| 9-160111 | 6/1997 | Japan . |
| 9-184965 | 7/1997 | Japan . |

*Primary Examiner*—W. B. Perkey
*Attorney, Agent, or Firm*—Fitzpatrick, Cella, Harper & Scinto

[57] ABSTRACT

A camera capable of line of sight detection, has a line of sight detecting device for detecting the line of sight of the user who is watching the screen, an operation member manually operated by the user, and a display for selecting and displaying at least one of a plurality of index marks set in the screen on the basis of an output from the line of sight detecting device. The display starts display of the index mark in response to operation of the operation member, and maintains display of the index mark even after the operation of the operation member is canceled.

13 Claims, 10 Drawing Sheets

OPTICAL APPARATUS AND CAMERA CAPABLE OF LINE OF SIGHT DETECTION

BACKGROUND OF THE INVENTION

1. Field of the Invention

The present invention relates to an improvement in an optical apparatus and camera with a line of sight detection function.

2. Related Background Art

Conventionally, a single-lens reflex camera detects the line of sight direction (watched point) of an observer to recognize the position on the frame the user is observing, and uses that information in, e.g., focus detecting area selection, or the like of an automatic focus detecting device.

A line of sight detection scheme suitable for a camera obtains a line of sight using the positional relationship between the pupil and a cornea reflected image (Purkinje image) based on light projected from a light source onto the front eye portion of the person under examination, and reflected by the cornea, as disclosed in, e.g., Japanese Patent Application Laid-Open No. 6-294930.

Also, Japanese Patent Application Laid-Open No. 2-32312 discloses the method of using watched point information suitable for focus detecting area selection. In this method, a line of sight position detected based on a signal generated in response to first-stroke operation (switch SW1=ON) of a release button is fixed, automatic focus adjustment is done at that position, and a shutter release circuit operates based on a signal generated in response to second-stroke operation (switch SW2=ON) of the release button. In this manner, the user need not select a specific one of a plurality of focus detecting areas. Around 100 focus detecting areas of the single-lens reflex camera can be set using an area type focus detecting technique proposed in Japanese Patent Application Laid-Open No. 9-184965 by the present applicant, and distance measuring point selection gains a its importance as the number of focus detecting areas increases.

However, selection of a focus detecting area based on the detection result of the watched point does not always result in quick photographing which is preferable in terms of composition, for the following reasons.

First, it is difficult to match the position to be focused on an object, watched point, and focus detecting area with each other. When a large number of focus detecting areas are placed at high density, since focusing is allowed at a desired position within the photographing frame, such areas are very advantageous for composition-priority photographing. However, if the positions of the focus detecting areas are displayed within the viewfinder, they may disturb object viewing since they are dense.

In one method devised to avoid such situation, the focus detecting areas are not displayed upon depression of the release button, and after a given focus detecting area is selected based on watched point information, that focus detecting area is displayed to assure a sufficient field of view for object observation. This method assumes the position to be focused on the object matches the watched point; it selects a focus detecting area close to that position later. However, since a display pattern that indicates the focus detecting areas is not displayed initially, a focus detecting area is not always present on the watched point, and whether or not the watched point is located on a focus detecting area is purely a stochastic question. If a rule for selecting a closest focus detecting area when no focus detecting area is present on the watched point is adopted, the user's will is not reflected unless focus detecting areas are placed at higher density.

As another method of avoiding the aforementioned drawback, a technique disclosed in Japanese Patent Application Laid-Open No. 9-160111 is extended; a watched point indication whose color, shape, or the like is different from that on a focus detecting area is displayed in areas other than the focus detecting areas within the viewfinder. In this case, focus adjustment is done after the user directs the camera toward the object and confirms that an indication that indicates if the watched point is located on a focus detecting area is ON. More specifically, priority is given to matching between the watched point and focus detecting area.

However, since the gap between neighboring focus detecting areas is in question now, the watched point does not match a focus detecting area, and non-coincidence between the watched point and focus detecting area may be detected initially. In such case, the user appropriately moves the line of sight to seek a position where the watched point matches a focus detecting area and the indication pattern changes. However, since the user has moved the line of sight, the watched point does not match the position to be focused on the object in turn. Hence, the user fixes the line of sight with respect to the camera, and adjusts the watched point and focus detecting area by turning together with the camera. In this case, a camera which can quickly adjust the focus to the watched point cannot be realized.

Second, selection of a focus detecting area based on the detection result of the watched point does not always result in quick photographing which is preferable in terms of composition, because of uncertainty of the watched point.

In general, motions of the eyeballs of a human being include a saccadic eye movement which takes place upon extracting image features and has a maximum rate of eyeball rotation angle as high as 300°/sec, a pursuit eye movement which takes place for a moving object at 30 to 35°/sec or less and is a slow and smooth movement, an involuntary eye movement which takes place involuntarily to capture a target object at the center and is an irregular, infinitesimal motion, and the like.

Since the eye of the user catches the target object upon pressing the release button, the pursuit and involuntary eye movements of these motions have taken place. Even in the involuntary eye movement of the eyeball, the user consciously watches one point on the target object. It is commonly held in physiological optics that the eye does not always catch one point on the target object in terms of an eyeball motion, but catches one point in terms of perception.

More specifically, this also means that the watched point as an eyeball motion detected at the first-stroke position of the release button may not always be the one the user consciously watched at that instance. Hence, the watched point detected as an eyeball motion is uncertain to some extent.

As described above, in the conventional line of sight input type auto-focus camera, upon matching (1) the position to be focused on the object, (2) the watched point, and (3) the focus detecting area, if (1) and (2) are determined beforehand on the condition that (2) the watched point is commonly used, a problem is posed upon determining (3); if (2) and (3) are determined beforehand, a problem occurs upon determining (1), thus disturbing quick focus adjustment. In this manner, two problems are posed, i.e., the three factors do not match each other, and the detection result of the watched point used therefor does not perfectly correspond to the user's watching consciousness.

These problems are especially serious upon photographing a moving object. More specifically, when the focus detecting area selected based on the line of sight is not located on the object and the focus is adjusted to the background, or when an unexpected focus detecting area is selected based on the watched point information, the object position is changing constantly even if the user wants to redo focusing. As a result, an image which is preferable in terms of composition can no longer be obtained, and it is impossible to redo focusing in practice. In association with the focus adjustment mode of the camera, the user often misses an important photographing chance due to selection of a focus detecting area based on the input line of sight in a servo AF mode that continuously adjusts the focus to a moving object.

SUMMARY OF THE INVENTION

One aspect of the invention is to provide a camera capable of line of sight detection, comprising line of sight detecting means for detecting a line of sight of a user who is watching a screen, an operation member manually operated by the user, and display means for selecting and displaying at least one of a plurality of index marks set in the screen on the basis of an output from the line of sight detecting means, wherein the display means starts display of the index mark in response to operation of the operation member, and maintains display of the index mark even after the operation of the operation member is canceled, so that the displayed index mark can be used as a reference for the next photographing.

DESCRIPTION OF THE PREFERRED EMBODIMENTS

Figure 1:
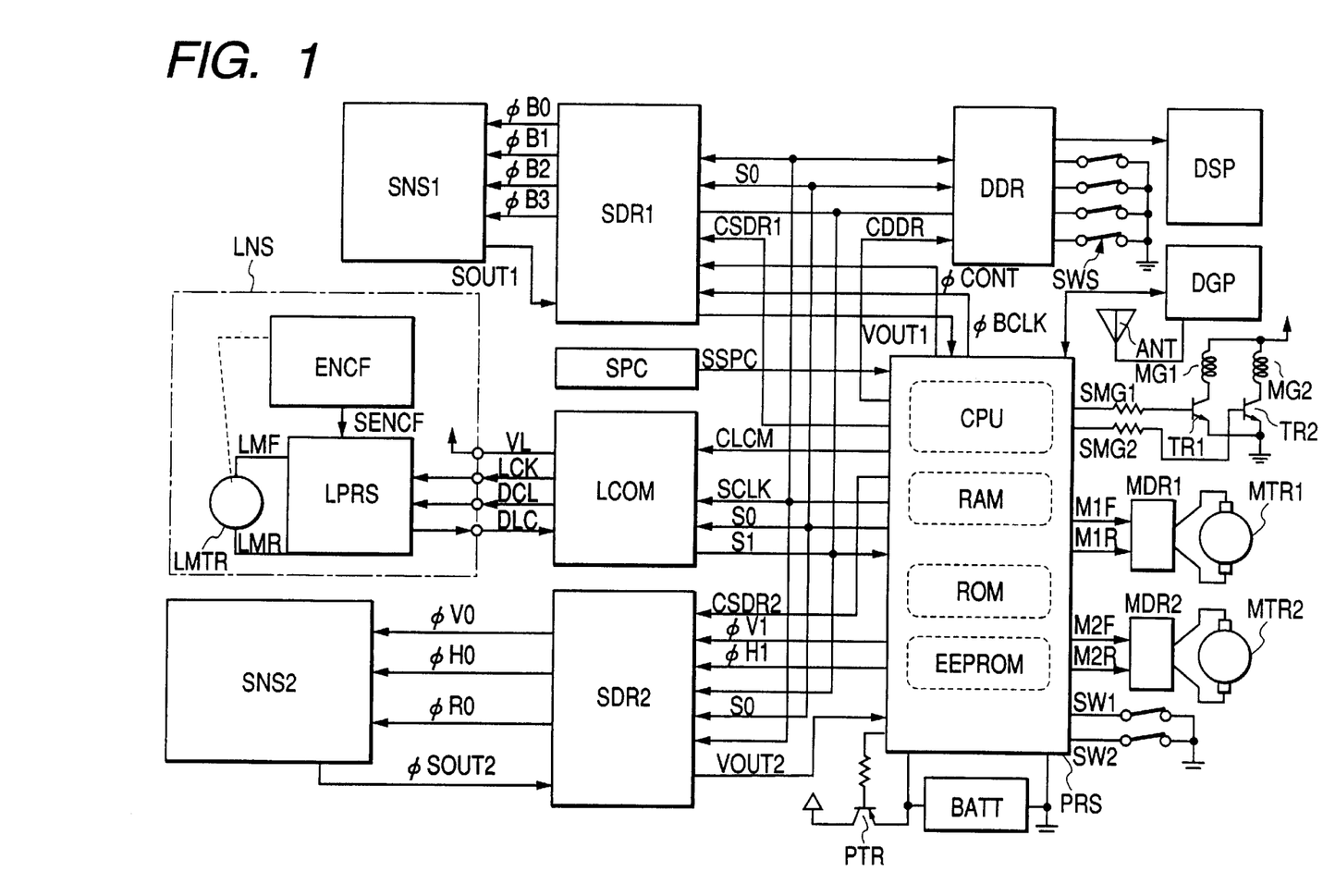
FIG. 1 is a block diagram showing the circuit arrangement of a camera with a line of sight detection function according to an embodiment of the present invention.

FIG. 1 is a block diagram showing the schematic arrangement of a camera with a line of sight detection function according to an embodiment of the present invention.

Referring to FIG. 1, a camera controller PRS is a one-chip computer (to be referred to as a computer hereinafter) which includes a CPU (central processing unit), ROM, RAM, EEPROM (electrically erasable programmable ROM), A/D conversion function, I/O ports, and the like. The computer PRS controls a series of operations of the camera such as an auto-exposure control function, line of sight detection function, display function, auto-focus adjustment function, film winding/rewinding, and the like in accordance with the sequence program of the camera stored in the ROM. For this purpose, the computer PRS communicates with peripheral circuits in the camera body and a control circuit in a photographing lens using communication signals SO, SI, and SCLK, and communication selection signals CLCM, CSDR1, and CSDR2, thus controlling operations of the respective circuits and photographing lens.

Of these signals, a data signal SO is output from the computer PRS. A data signal SI is input to the computer PRS. A sync clock signal SCLK is used for synchronizing these signals SO and SI.

A buffer circuit LCOM for photographing lens communications supplies electric power to a power supply terminal VL for a photographing lens during camera operation, and serves as a communication buffer between the camera and photographing lens when the selection signal CLCM from the computer PRS is at high potential level (to be abbreviated as "H" hereinafter; a low potential level will be abbreviated as "L" hereinafter).

When the computer PRS sets the signal CLCM to "H", supplies an "H" signal to the buffer circuit LCOM, and outputs predetermined data as the signal SO in synchronism with the clock signal SCLK, the buffer circuit LCOM outputs buffer signals LCK and DCL of the signals SCLK and SO to a photographing lens LNS via communication contacts between the camera and photographing lens. At the same time, the buffer circuit LCOM outputs a signal DLC from the photographing lens LNS as a buffer signal SI to the computer PRS, which reads out photographing lens data from the signal SI in synchronism with the clock signal SCLK.

A switch detection and display driving unit DDR is selected when a signal CDDR is "H", and is controlled by the computer PRS using the signals SO, SI, and SCLK. More specifically, the driving unit DDR switches display on a liquid crystal display DSP of the camera on the basis of data sent from the computer PRS, and informs the computer PRS of ON/OFF states of various operation members of the camera.

Switches SW1 and SW2 are interlocked with a release button (not shown). One terminal of each of the switches SW1 and SW2 is connected to ground, and the other end is connected to the terminal of the computer PRS. The terminals of the computer PRS to which the switches SW1 and SW2 are connected are connected to the positive terminal of a battery via a pull-up resistor (not shown).

The switch SW1 is turned on at the first (half) stroke position of the release button, and the switch SW2 is turned on at the second (full) stroke position of the release button. When the switch SW1 is turned on, the computer PRS changes its terminal connected to a transistor PTR via a resistor to "L" so as to turn on the transistor PTR, thereby starting power supply to electric elements which are kept OFF. After an elapse of a predetermined period of time in a power supply timer, the computer PRS turns off the transistor PTR to stop power supply to the electric elements.

Note that the switch SW2 is connected to an "interrupt input terminal" of the computer PRS, and even while a program is being executed upon ON of the switch SW1, that program is interrupted upon ON of the switch SW2 and the control can immediately enter a predetermined interrupt program.

Driving circuits MDR1 and MDR2 respectively control forward/reverse rotation of a film feed motor MTR1 and motor MTR2 for moving a mirror up/down and charging a shutter spring. Signals M1F, M1R, M2F, and M2R input from the computer PRS to the driving circuits MDR1 and MDR2 are motor control signals. Magnets MG1 and MG2 are respectively used for initiating travel of the leading and trailing curtains of the shutter, and open/close of the shutter is controlled by energizing amplification transistors TR1 and TR2 by signals SMG1 and SMG2 from the computer PRS.

A GPS (Global Positioning System) receiver DGP detects the current position by receiving data including time information and the like transmitted from an artificial satellite via an antenna ANT. The geographical position information obtained by the GPS receiver DGP is sent to the computer PRS, which uses the position information in line of sight detection control. Offset information between the watched point and line of sight is stored as personal difference information, which is used for improving line of sight detection precision. In this case, when this personal difference information is used in association with the current location of the user, correction can be done more accurately.

A control circuit LPRS in the photographing lens LNS receives a signal DCL from the camera in synchronism with a clock signal LCLK. This signal DCL is command data sent from the camera to the photographing lens LNS, and operations of the photographing lens corresponding to this command are determined in advance. The control circuit LPRS interprets that command in accordance with a predetermined procedure, and outputs a signal DLC indicating the results of focus adjustment and stop control, the driving states of a focus adjustment optical system and stop of the photographing lens, and the like.

Upon receiving a focus adjustment command from the camera, the control circuit LPRS drives a focus adjustment motor LMTR in accordance with data indicating a driving amount and direction received at the same time to move the focus adjustment optical system in the optical axis direction, thus adjusting the focus. In this case, focus adjustment is controlled by control signals LMF and LMR. The control circuit LPRS counts signals SENCF output from an encoder circuit ENCF, which outputs pulses corresponding in number to the moving amount of the optical system. When the count value matches a value sent from the buffer circuit LCOM, the control circuit LPRS changes the signals LMF and LMR to "L" to stop the motor LMTR. For this reason, once the focus adjustment command has been received from the camera, the computer PRS of the camera need not be concerned in driving of the photographing lens.

A photometry sensor SPC receives object light via the photographing lens LNS, and its output SSPC is supplied to the analog input terminal of the computer PRS and is used in auto-exposure control after it is A/D-converted.

An accumulation area sensor SNS1 for a focus detecting device comprises a pair of area photoelectric conversion elements. This area sensor is segmented into a large number of areas, which respectively correspond to focus detecting areas. A specific one of a large number of focus detecting areas can be set as the one for focus adjustment. Since objects normally have different distances, it is very effective to adjust the focus by selecting a specific focus detecting area.

A sensor driving circuit SDR1 controls the area sensor SNS1 in accordance with the following signals input from the computer PRS. A signal CSDR1 is used when the computer PRS communicates with the sensor driving circuit SDR1. A data signal SO selects some driving modes prepared in advance in the sensor driving circuit SDR1, a gain used upon amplifying an image signal output from the area sensor SNS1, and a photoelectric conversion element area to be driven and read of the pair of area photoelectric conversion elements. A reference clock signal φBCLK is used upon operating the sensor driving circuit SDR1, which drives the area sensor SNS1 in synchronism with this clock signal.

Signals φB0, φB1, φB2, and φB3 input to the area sensor SNS1 are driving signals for driving and reading one photoelectric conversion element area selected by the data signal SO, and drive the area sensor SNS1 in accordance with a signal φCONT output from the computer PRS.

A sensor driving circuit SDR2 drives an area sensor SNS2. These driving circuit and sensor are used in line of sight detection.

The area sensor SNS2 has a two-dimensional matrix of a plurality of photoelectric conversion elements. The eyeball is illuminated with light emitted by a plurality of IREDs which project infrared light to which the observer is insensitive, and an eyeball image is projected onto the area sensor SNS2. The IREDs are laid out in the horizontal and vertical directions, and the coordinate position of the watched point on the viewfinder is calculated by examining the positional relationship between an image formed by the IREDs on the area sensor SNS2 and an iris image. This information is used upon setting a focus detecting area. Such process is called automatic focus adjustment based on the line of sight input.

The sensor driving circuit SDR2 controls the area sensor SNS2 in accordance with signals input from the computer PRS. A data signal SO selects a specific one of some driving modes prepared in advance to drive the area sensor SNS2. At this time, the sensor driving device SDR2 can inform the computer PRS of the driving states using a data signal SI.

Signals φVI and φHI serve as sync signals for reading out an image signal SOUT2 from the area sensor SNS2 depending on the driving mode selected by the data signal SO. A signal φVO input to the area sensor SNS2 is a vertical transfer clock signal used for transferring pixel outputs in the vertical direction upon reading out pixel outputs, and a signal φHO is a horizontal transfer clock signal used for transferring pixel outputs in the horizontal direction. Also, a reset signal φRO is used for resetting the readout system.

An output VOUT2 of the sensor driving circuit SDR2 is an image signal obtained by amplifying an image signal SOUT2 output from the area sensor SNS2 by a gain determined by the data signal SO from the computer PRS. The image signal output VOUT2 is supplied to the analog input terminal of the computer PRS, which uses this signal in a series of line of sight detection processes after A/D-converting it.

Power supply to these photometry sensor SPC, area sensor SNS1, sensor driving circuit SDR1, area sensor SNS2, sensor driving circuit SDR2, and liquid crystal display DSP is started after the switch SW1 is turned on at the half-stroke position of the release button, and is stopped by a power supply timer (to be described later). In this manner, electric power is supplied as required, and power consumption can be minimized.

Figure 2:
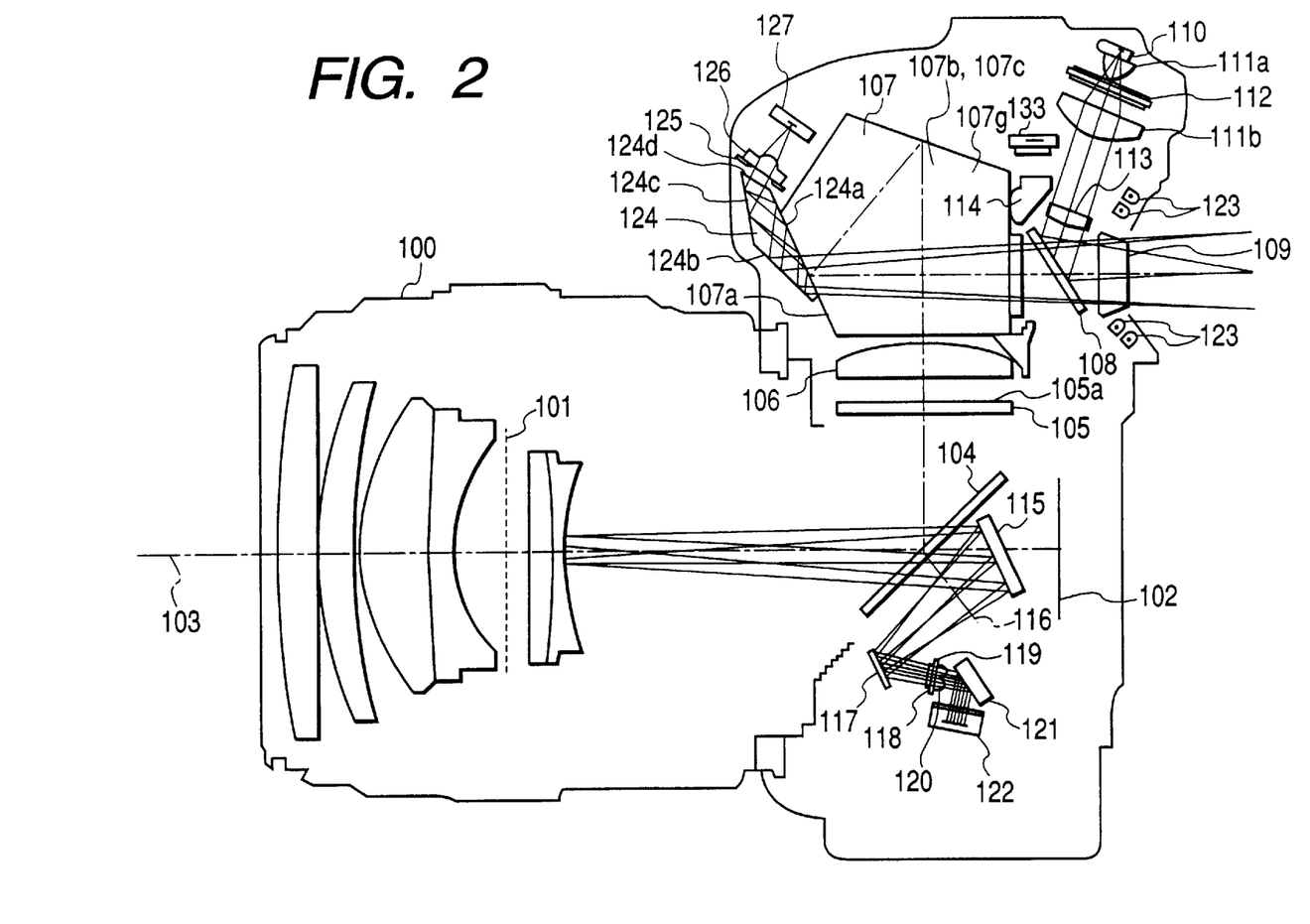
FIG. 2 is a sectional view showing the optical layout of the camera shown in FIG. 1.

FIG. 2 shows the optical layout of the camera with the aforementioned arrangement. The camera comprises a superimpose display device for superimposing and displaying information on an object image, a focus detecting device, and a line of sight detecting device. Note that this superimpose display system is of active type that displays by emitting light. A superimpose display system of this type allows very high visibility, and is most suitable for display that indicates a focus detecting area.

Elements that build a viewfinder optical system and the superimpose display device will be explained first.

Referring to FIG. 2, a photographing lens 100 includes a stop 101, and has an optical axis 103. An image sensing means such as a photographic film, CCD, or the like is placed on an image sensing plane 102. A main mirror 104 is placed on the optical axis 103 of the photographing lens, and has a central semi-transparent region. A focusing screen 105 has a flat light entrance surface, and a mat surface 105a serving as a light exit surface. A condenser lens 106 and pentagonal prism 107 are placed above the focusing screen 105. The pentagonal prism 107 has a dichroic mirror surface 107a with specific characteristics. That is, the surface 107a reflects visible light and transmits light having wavelengths around 880 nm for a line of sight detecting device (to be described later). A dichroic mirror 108 mainly reflects light within the wavelength range from 670 nm to 860 nm. More specifically, the dichroic mirror 108 transmits most of visible light components and infrared light used in line of sight detection, and reflects red light used in superimpose display. An eyepiece 109 is located behind the dichroic mirror 108.

A red LED (light-emitting diode) 110 serves as a light source for the superimpose display system. A liquid crystal display (corresponding to DSP in FIG. 1) 112 is located between focusing lenses 111a and 111b, and is designed to allow only display segments to transmit light. A display lens 113 is used for adjusting the display diopter of the liquid crystal display 112 to that of the focusing screen 105.

The liquid crystal display 112 has frame-shaped display segments corresponding to a focus detecting area of the focus detecting device. More specifically, when user observes these segments via the viewfinder, he or she can see a frame-shaped display pattern indicating the position of the focus detecting area.

An object image is formed on the mat surface 105a of the focusing screen 105 by light reflected by the main mirror 104. Visible light transmitted through the focusing screen 105 enters the pentagonal prism 107 via the condenser lens 106, and is reflected once by roof surfaces 107b and 107c formed at the front and back sides of the plane of paper of FIG. 2 to have a ridgeline 107g. After that, the light reaches the dichroic mirror surface 107a and is reflected once again toward the eyepiece 109. When the user observes the mat surface 105a of the focusing screen via the eyepiece 109, he or she can observe the object image as an erected image. A photometry sensor (corresponding to SPC in FIG. 1) 133 is located above a photometry lens 114.

Elements that build the focus detecting device will be explained below.

The focus detecting device comprises a first reflection mirror 115 which is obliquely located on the optical axis 103 of the photographing lens, a paraxial imaging plane 116 which is conjugate with the image sensing surface 102 bent by the first reflection mirror 115, a second reflection mirror 117, an infrared ray cut filter 118, a stop 119 which has two, upper and lower apertures, a re-imaging lens block 120 having two lens portions corresponding to the apertures of the stop 119, a third reflection mirror 121, and an area sensor (corresponding to SNS1 in FIG. 1) 122 having a pair of two-dimensional light-receiving areas.

The light-receiving areas of the area sensor 122 are constructed by a plurality of sensor arrays consisting of a large number of pixels having identical light-receiving apertures, and the sensor arrays on the two areas form pairs. When the sensor arrays are divisionally used, a very large number of focus detecting areas can be obtained.

Note that the first reflection mirror 115 is an elliptic mirror, and two focal points that define the ellipse are respectively located on a line obtained by extending, toward the photographing lens, the optical path after a light ray on the optical axis 103 of the photographing lens is refracted by the main mirror 104, and a line obtained by extending the optical path after that light ray is reflected by the first reflection mirror.

Since the first reflection mirror 115 also serves as a field mask that limits the focus detecting areas, only a required region thereof reflects light. The second and third reflection mirrors 117 and 121 are plane mirrors. Of these building elements, those having an optical function are symmetrical about the plane of paper.

Elements which build the line of sight detecting device will be explained below.

An IRED (infrared light-emitting diode) 123 illuminates the eyeball of the user with infrared light, and has a central emission wavelength of 880 nm. A prism 124 guides light reflected by the eyeball toward an area sensor (corresponding to SNS2 in FIG. 1) 127, and a stop 125 and imaging lens 126 are located above the prism 124.

A small gap is formed between the dichroic mirror surface 107a of the pentagonal prism 107, and a surface 124a of the prism 124. A light ray emerging from the dichroic mirror surface 107a of the pentagonal prism 107 enters the prism 124 from its surface 124a, and is totally reflected three times by surfaces 124b, 124a, and 124c. Then, the light ray emerges from a surface 124d toward the stop 125.

Superimpose display will be described below.

In this superimpose display device, the liquid crystal display 112 is illuminated using the LED 110 and focusing lens 111a, and is observed from the direction of the eyepiece 109 via the dichroic mirror 108, display lens 113, and focusing lens 111b.

As general characteristics of a dielectric multilayer, the dichroic mirror 108 does not absorb any light, and has spectral transmission characteristics that are obtained by inverting spectral reflectance characteristics. Hence, of visible light components of an object that have been transmitted through the focusing screen 105, light components of 670 nm or less are transmitted through the dichroic mirror 108 and reach the eyepiece 109, and red components having wavelengths higher than 670 nm are reflected.

The way the object is observed via the dichroic mirror 108 with such characteristics depends on the sensitivity characteristics of the eyes of a human being. The red wavelengths of 670 nm or higher correspond to the end of the visible range, and has very low sensitivity. In fact, even when the object is observed while cutting this wavelength range, a viewfinder image is not tinted, and has nearly no color difference from an actual image. Since most amount of light is transmitted, the brightness of the image can be prevented from dropping due to the presence of the dichroic mirror 108.

However, the eyes of a human being have sensitivity to light of 670 nm or higher, and if intense light becomes incident on the eye even when it falls within this wavelength range, red can be visually confirmed. The superimpose display system exploits such characteristics, i.e., uses an LED 110 of a central emission wavelength of 695 nm, which has an emission intensity at 670 nm or higher.

If the transmittance of the dichroic mirror 108 for this wavelength is set at nearly 0%, i.e., the reflectance is set at nearly 100%, display light can be efficiently reflected by the dichroic mirror 108 and can be deflected toward the viewfinder optical path.

Alternatively, the reflection wavelength range of the dichroic mirror 108 may be set around 450 nm corresponding to the visible wavelength range end on the shorter wavelength side, and blue display may be made using a blue LED. Also, two-color display using both blue and red light sources, or three-color display also including a case wherein both the blue and red light sources are ON, may be made.

The focus detecting device will be explained below. This focus detecting device has a so-called image-offset detection system for splitting the pupil of the photographing lens in the vertical direction.

Some light components of a light beam coming from the photographing lens 100 are transmitted through the main mirror 104, and are reflected by the first reflection mirror 115 in a direction roughly extending along the tilt of the main mirror 104. Since the first reflection mirror 115 is an elliptic mirror, as described above, the vicinities of the two focal points can be substantially set to have a projection relationship therebetween. In this embodiment, one focal point is set at a point optically equivalent to the representative exit pupil position of the photographing lens, and the other focal point is set at a point optically equivalent to the stop 119 which can serve as an entrance pupil of the re-imaging optical system, thus providing a function of a field lens. In other words, the first reflection mirror serves as a pupil projection means for projecting the entrance pupil of the re-imaging optical system to the representative exit pupil position of the photographing lens.

Note that the representative exit pupil position of the photographing lens is a virtual pupil position unique to the focus detecting system, which is determined in consideration of the conditions of exit windows of various photographing lenses that can be mounted on the camera. The exit window is a virtual image when the front and rear apertures of the photographing lens 100 are observed via the subsequent lens systems.

The light beam reflected by the first reflection mirror 115 is reflected again by the second reflection mirror 117, and enters the infrared ray cut filter 118. Infrared rays that may cause drop of the focus detection precision are removed by this filter, and only light components within the sufficiently aberration-corrected wavelength range of the photographing lens reach the stop 119 and re-imaging lens block 120, which are located behind the filter 118.

The light beam which has passed through the two, upper and lower apertures of the stop 119 converges upon receiving the effect of the re-imaging lens block 120, and forms two secondary object images on the area sensor 122 (SNS1) via the third reflection mirror 121. By detecting the relative positional relationship between the two secondary object images using the outputs from the area sensor 122, the imaging state of the photographing lens 100 at each position on the image sensing plane can be detected.

Figure 3:
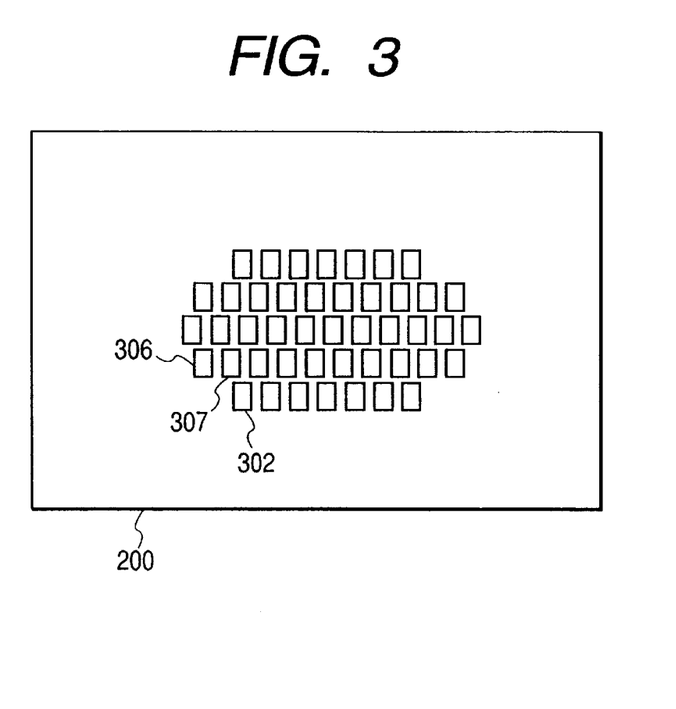
FIG. 3 is a plan view showing the layout of focus detecting areas provided to the camera shown in FIG. 1.

FIG. 3 shows the distribution of focus detecting areas when viewed from the viewfinder of the camera.

Rectangular display patterns that represent a total of 45 focus detecting areas are located in a staggered pattern on the central portion of a photographing frame 200, and the individual rows of the patterns respectively include 7, 10, 11, 10, and 7 focus detecting areas. The display segments for these areas are formed on the liquid crystal display 112, as described above, and are selectively displayed in red as the color of light emitted by the LED 110 to be superimposed on an object image.

The line of sight detecting device will be explained below.

Figure 4:
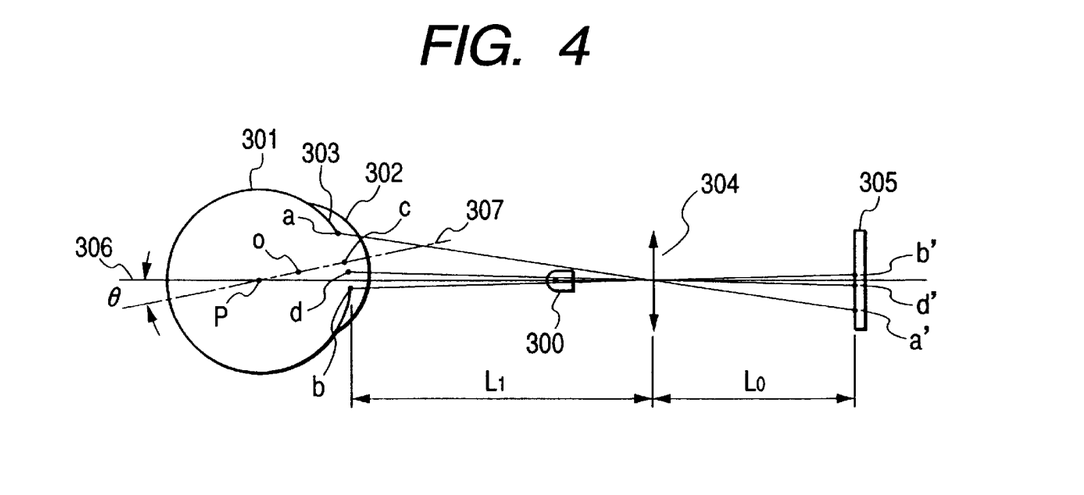
FIG. 4 is a view for explaining the general principle of line of sight detection.

FIG. 4 shows the principle of a line of sight detection method, and illustrates a state when the eyeball of the user is viewed from the above.

Referring to FIG. 4, a light-emitting diode (IRED) 300 emits infrared light to which the observer is insensitive, and corresponds to the IRED 123 shown in FIG. 2. FIG. 4 illustrates only one IRED, but in practice several IREDs are preferably selectively used to cope with various camera positions and to remove the influence of ghost formed by spectacles.

Infrared light emitted by the IRED 300 illuminates a cornea 302 of an eyeball 301. At this time, a first Purkinje image d based on some light components of the infrared light reflected by the surface of the cornea 302 appears at a position which is located on a line connecting the IRED 300 and a center o of radius of the cornea 302, and has a depth equivalent to that of an iris 303. This state can be observed by forming the eyeball image on an area sensor 305 via an imaging lens system 304.

The area sensor 305 corresponds to the area sensor 127 shown in FIG. 2, and the area sensor SNS2 shown in FIG. 1. The imaging lens system 304 represents the total characteristics of the eyepiece 109, pentagonal prism 107, prism 124, and imaging lens 126 shown in FIG. 2.

A secondary image d' of the Purkinje image, and images a' and b' of edges a and b of the iris 303 are formed on the area sensor 305. If a rotation angle θ an optical axis 307 of the eyeball makes with an optical axis 306 of the imaging lens system 304 is small, if Za and Zb represent the z-coordinates of the edges a and b of the iris 303, a coordinate Zc of a central position c of the iris 303 is given by:

$$Zc \cong (Za+Zb)/2$$

Let Zd be the z-coordinate of the generation position d of the Purkinje image, and Loc be the distance between the center o of curvature of the cornea 302 and the center c of the iris 303. Then, the rotation angle θ of the eyeball optical axis 307 nearly satisfies:

$$Loc \cdot \sin\theta \cong Zc - Zd \quad (1)$$

For this reason, by detecting the positions of the individual feature points (images Za', Zb', and Zd' of the generation position d of the Purkinje image, and the edges a and b of iris 303 on the area sensor 305), the rotation angle θ of the eyeball optical axis 307 can be obtained. At this time, equation (1) above is rewritten as:

$$\beta \cdot Loc \cdot \sin\theta = (Za'+Zb')/2 - Zd' \quad (2)$$

where β is the magnification which is determined by a distance L1 between the generation position d of the Purkinje image and the imaging lens system 304, and a distance Lo between the imaging lens system 304 and area sensor 305, and normally assumes a nearly constant value.

Control done by the computer PRS shown in FIG. 2 will be explained below with reference to the flow charts shown in FIGS. 5 and 6.

Figure 5:
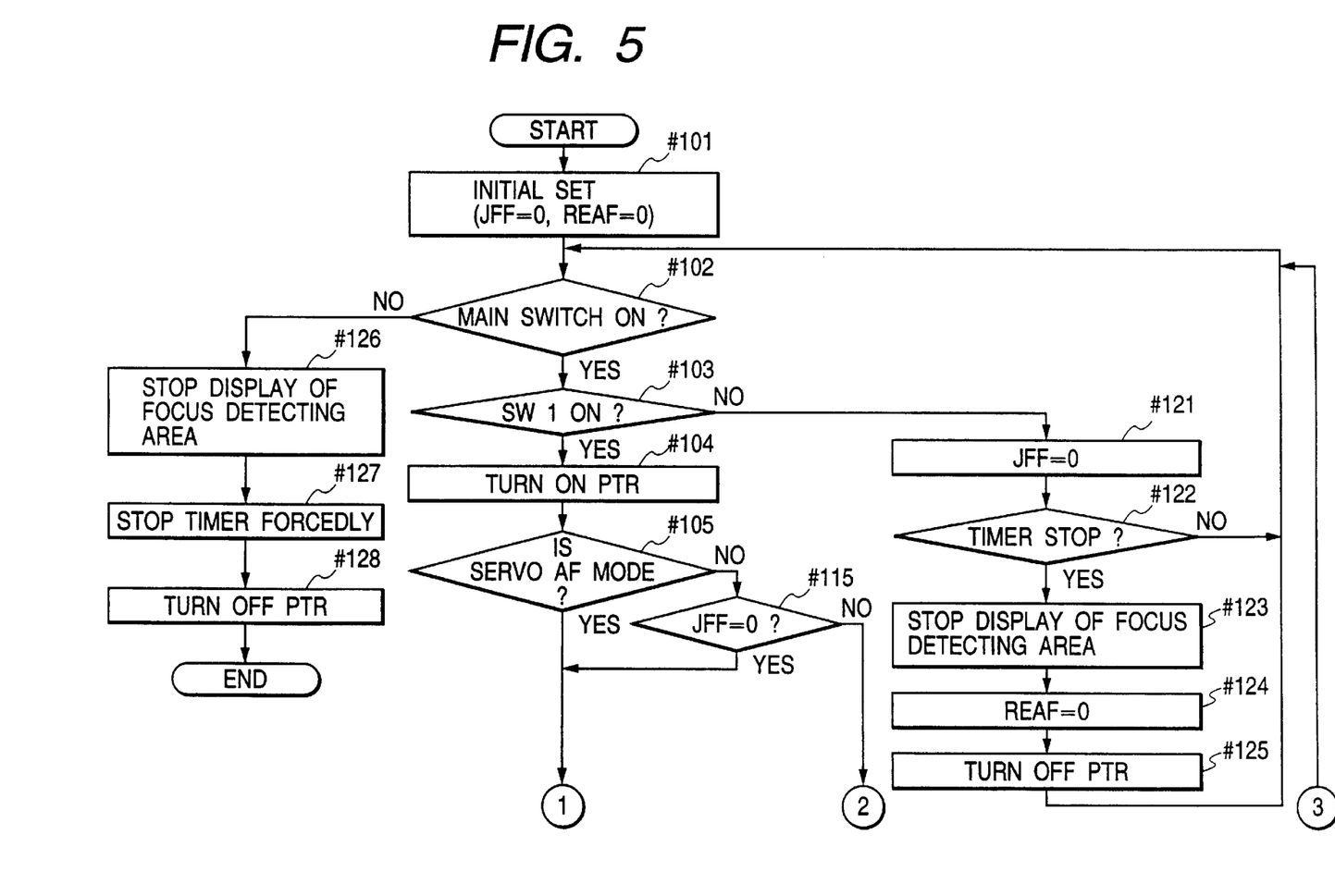
FIG. 5 is a flow chart showing some operations of the camera with the line of sight detection function according to the embodiment of the present invention.
Figure 6:
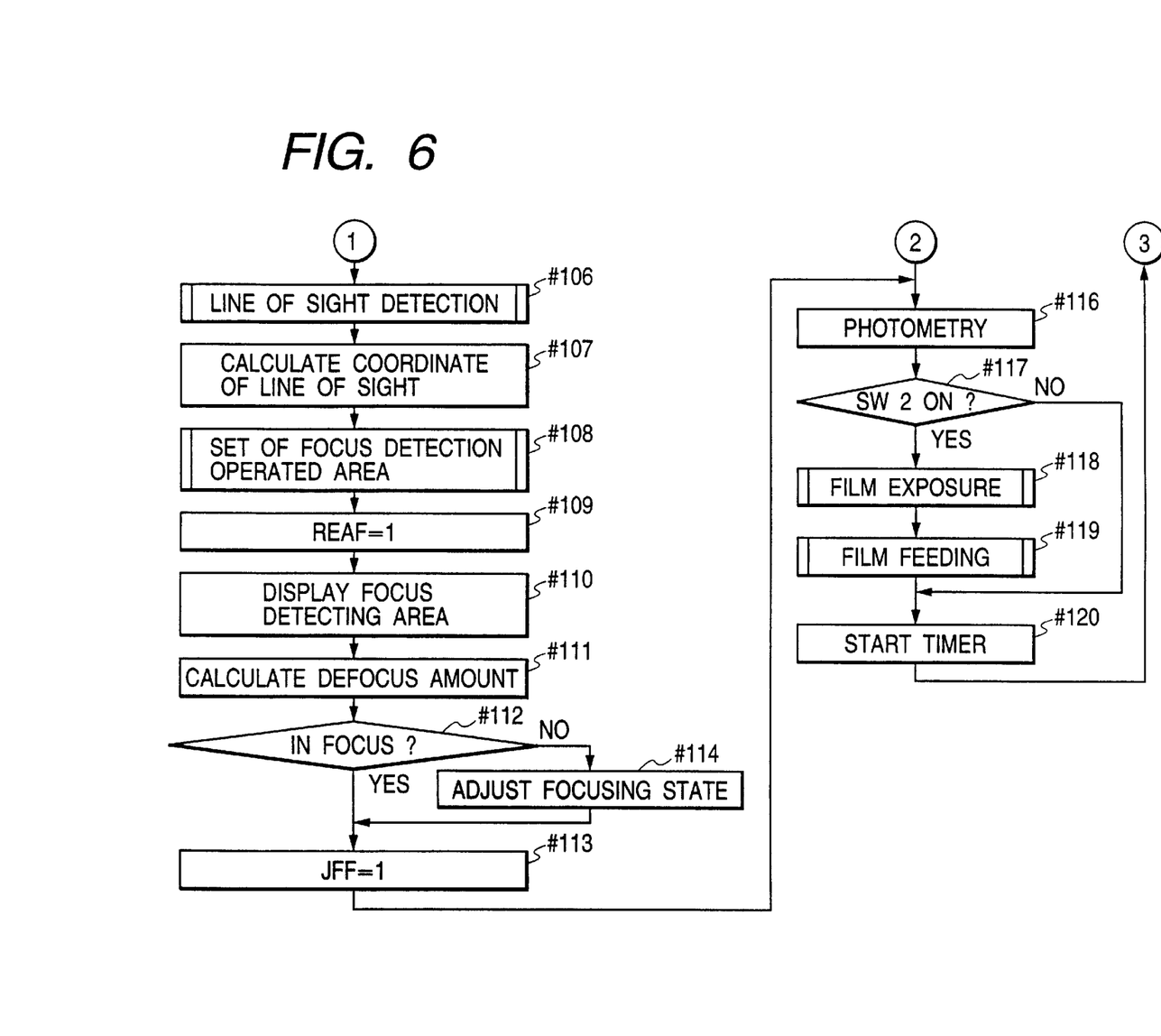
FIG. 6 is a flow chart showing the operations after FIG. 5.

When the switch detection and display driving unit DDR detects that a main switch (not shown) is turned on, the computer PRS confirms that the main switch is ON via a communication with the driving unit DDR, and starts operation from step #101 in FIG. 5.

In step #101, the computer PRS executes initialization, i.e., reads out data from the internal ROM as needed and stores them at predetermined locations on the memory, and sends data such as the photographing mode of the camera to be displayed on the in liquid crystal display DSP to the driving unit DDR. At this time, the computer PRS resets a flag JFF which indicates an in-focus state, and a flag REAF which indicates that the switch SW1 is turned on during operation of the power supply timer. The power supply timer preferably has a duration from 2 sec to 1 min in relation to the capacity of a battery BATT.

In step #102, the computer PRS checks the state of the main switch. If the main switch is OFF, the flow advances to step #126; if the main switch is kept ON, the flow advances to step #103. It is checked in step #103 if the switch SW1 which operates at the first stroke position of the release button (not shown) is ON. If the switch SW1 is ON, the flow advances to step #104; otherwise, the flow advances to step #121.

Assume that the switch SW1 is ON, and the flow advances to step #104.

In step #104, the computer PRS changes the control terminal to "L" to turn on the transistor PTR. Since the transistor PTR is turned on, electric power is supplied to electric elements which are powered as necessary, i.e., the photometry sensor SPC, sensor driving circuit SDR1, area sensor SNS1, sensor driving circuit SDR2, area sensor SNS2, liquid crystal display DSP, and the like. At the same time, the computer PRS acquires data required for a series of processes such as a photometry calculation, AF control, and the like from the photographing lens LNS, and stores the data at a predetermined location on the memory. Note that the data is updated every time the aforementioned process is done. Hence, the computer PRS can cope with even a change in zoom position of the photographing lens LNS.

It is then checked in step #105 if a servo AF mode or one-shot AF mode is selected as the focus adjustment mode. If the one-shot AF mode is selected, the flow advances to step #115; otherwise, the flow immediately advances to step #106.

In the servo AF mode, focus adjustment is started in response to depression of the release button, and is continuously done to follow changes in focus upon movement of an object. This mode is especially effective for shooting sport events and the like. In the one-shot AF mode, focus adjustment is similarly started in response to depression of the release button. Once an in-focus state is obtained, the lens is inhibited from being driven so as to maintain an object distance corresponding to an in-focus state. This mode is used when the object moves very little.

In step #106, a line of sight is detected using the sensor driving circuit SDR2 and area sensor SNS2 (the line of sight detection will be described in detail later with reference to FIG. 14). In step #107, the coordinate position of a watched point obtained in step #106 on the viewfinder is calculated. In this case, if the line of sight detection fails, the same coordinate position as the previous one is used. Subsequently, in step #108, a focus detection operated area setup subroutine is called to set a focus detecting area (to be referred to as a focus detection operated area hereinafter) actually used in focus detecting operation. This subroutine executes focus adjustment which does not always use information of a focus detecting area closest to the watched point, as will be described in detail later with reference to FIG. 9.

In step #109, the computer PRS sets the flag REAF indicating that the switch SW1 is turned on during operation of the power supply timer. This flag is reset when the power supply timer has reached time-up (in step #124 to be described later). In step #110, the computer PRS sends information of the focus detection operated area set in step #108 to the driving unit DDR to display that area within the viewfinder. Upon receiving this information, the driving unit DDR drives the liquid crystal display DSP to set only display segments corresponding to a focus detecting area set as the focus detection operated area in a transmission state and set other display segments in a non-transmission state. As a result, a display pattern 201 indicating a single focus detecting area is displayed on the viewfinder, as shown in, e.g., FIG. 7.

In step #111, the computer PRS detects the focus adjustment state (defocus amount) of the photographing lens using the sensor driving circuit SDR1 and area sensor SNS1. It is checked in step #112 if a defocus amount calculated in step #111 falls within an in-focus range. Note that the discrimination method in this step slightly differs depending on the one-shot or servo AF mode selected. That is, the one-shot AF mode directly evaluates the current residual defocus amount, while the servo AF mode evaluates a predicted residual defocus amount at that time in consideration of a time lag from when the release button is depressed to its second stroke position until the film is actually exposed. If an in-focus state is determined according to such discrimination result, the flow advances to step #113; otherwise, the flow advances to step #114.

In step #114, the computer PRS directs the photographing lens LNS of the lens driving amount and direction via the control circuit LPRS in the photographing lens. The control circuit LPRS in the photographing lens drives the focus adjustment motor LMTR to move the focus adjustment optical system in the optical axis direction, thus adjusting the focus. Then, the flow advances to step #113.

In step #113, the flag JFF indicating an in-focus state is set since the current focus adjustment is complete. The flow then advances to step #116. Note that this flag is used in discrimination in only the one-shot AF mode, as will be described below.

More specifically, if it is determined in step #105 that the one-shot AF mode is selected, the flow advances to step #115 to check the status of the flag JFF. If the flag JFF is not set, the flow advances to step #106 described above; if the flag is set, the flow advances to step #116. More specifically, if focus adjustment has been finished in the one-shot AF mode, the flow directly advances to step #116 without repeating focus adjustment.

In step #116, the computer PRS obtains object luminance data using the photometry sensor SPC, and calculates an optimal exposure control value using information acquired from the photographing lens. The exposure control value obtained at this time is output from the computer PRS to the driving unit DDR, and is superimposed by the liquid crystal display DSP and LED 110. It is then checked in step #117 if the switch SW2 which operates at the second stroke position of the release button (not shown) is ON. If the switch SW2 is ON, the flow advances to step #118; otherwise, the flow advance to step #120. The switch SW2 generates a film exposure control start signal.

In step #118, the computer PRS sends aperture value information obtained by a photometry calculation in step #116 to the photographing lens LNS via the buffer circuit LCOM to stop down the stop to a predetermined value, and drives the motor MTR2 via the driving circuit MDR2 to move the mirror upward. Also, the computer PRS outputs signals SMG1 and SMG2 to the amplification transistors TR1 and TR2 to energize the magnets MG1 and MG2 for initiating travel of the leading and trailing curtains of the shutter, thus performing film exposure for a predetermined period of time. Upon completion of film exposure, the computer PRS releases the stop of the photographing lens LNS, and drives the motor MTR2 to move the mirror downward.

In step #119, the computer PRS drives the film feed motor MTR1 via the driving circuit MDR1 to feed the film to prepare for the next photographing. In step #120, the computer PRS sets a value obtained by subtracting an elapsed time from a default value in its internal timer and starts it as the power supply timer. The flow then returns to step #102. This default value is preferably set at 2 sec to 1 min, as described above.

The operation after the flow advances to step #121 if it is determined in step #103 that the switch SW1 is OFF will be explained below.

Since it is determined in step #103 that the release button is not pressed, the flag JFF indicating an in-focus state is reset in step #121. At this time, when step #110 above has already been executed, since focus detecting area display is made, a focus detecting area is superimposed in the viewfinder as in the above description, as shown in FIG. 7.

In step #122, the computer PRS checks the status of the power supply timer. If the power supply timer is not zero, i.e., has not reached a time-up yet, since power supply must be maintained, the flow returns to step #102 to monitor status of the main switch again.

Figure 7:
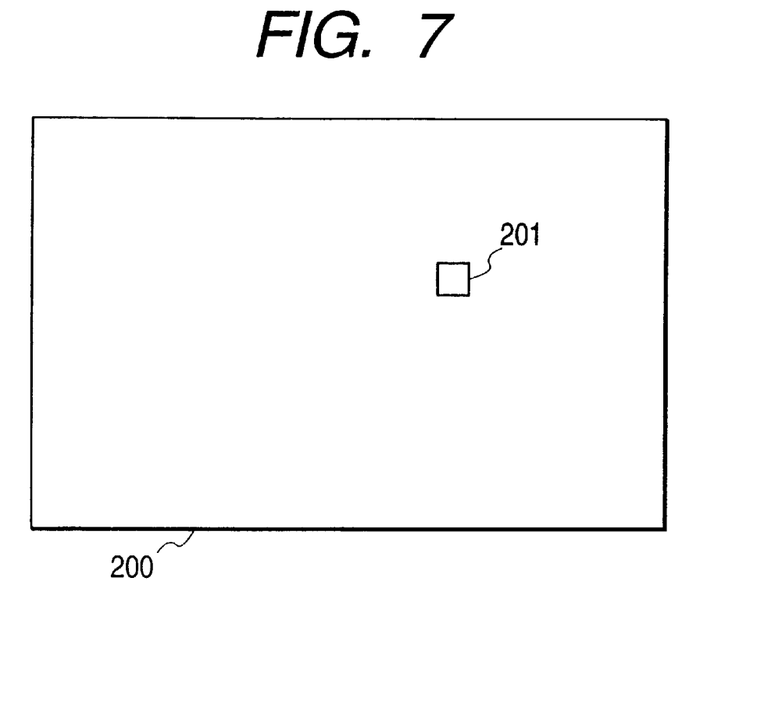
FIG. 7 is a view showing a focus detecting area displayed within a viewfinder.

While the control stays in the loop of step #122→ #102→ #103→ #121→ #122, the focus detecting area display maintains the state shown in FIG. 7. Hence, during this interval, the user can adjust the superimposed display pattern to a specific position (the position to be focused) on the object and can press the release button while observing this display pattern. If the release button has been pressed in this way, the control leaves this loop in step #103, and focus adjustment can be reliably started without deviating the focus detecting area from points on the object.

Since a non-displayed focus detecting area can be adjusted to an object with reference to the superimposed display pattern, the absence of a focus detecting area on the watched point at the time of depression of the release button can often be avoided.

Figure 8:
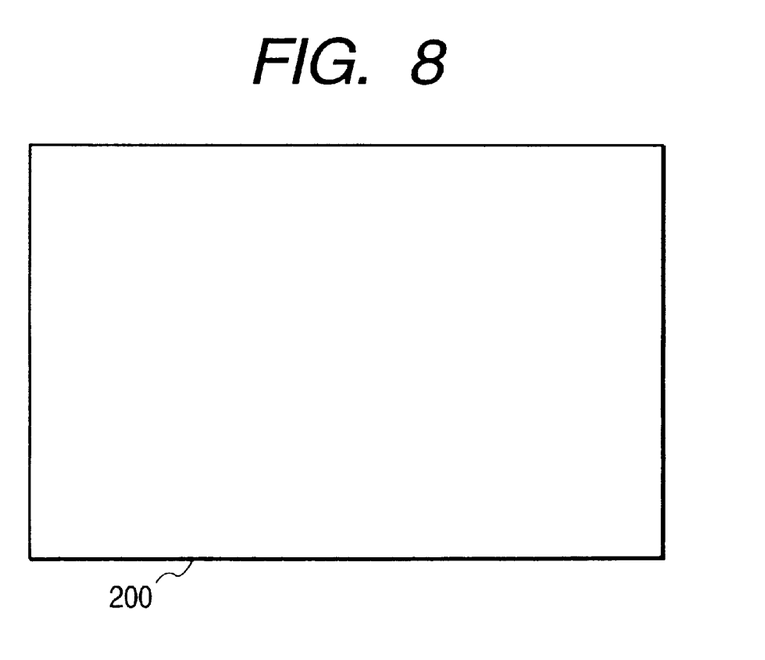
FIG. 8 is a view showing a focus detecting area displayed within the viewfinder.

On the other hand, if the power supply timer has reached a time-up, the flow advances from step #122 to #123. If the display pattern is displayed in the viewfinder in step #108, the computer PRS sends a message, indicating that the pattern display is turned off to attain power savings, to the driving unit DDR, and turns off the LED 110, thereby turning off the focus detecting area display in the viewfinder, as shown in FIG. 8.

In step #124, the computer PRS resets the flag REAF indicating that the switch SW1 is turned on during operation of the power supply timer. In step #125, the computer PRS changes the control terminal connected to the base of the transistor PTR to "H" to turn off the transistor PTR, thus stopping power supply to electrical elements which are powered only when they are required. The flow then returns to step #102 to monitor status of the main switch again.

If it is determined in step #102 that the main switch is OFF, the flow advances to step #126, as described above. If the display pattern is displayed in the viewfinder in step #108, the computer PRS sends a message, indicating that the pattern display is turned off, to the driving unit DDR, and turns off the LED 110, thereby turning off the focus detecting area display in the viewfinder, as shown in FIG. 8. The computer PRS forcibly quits the power supply timer in step #127, and changes the control terminal connected to the base of the transistor PTR to "H" to turn off the transistor PTR in step #128, thus stopping power supply to electrical elements which are powered only when they are required. In this way, the control shown in this flow chart ends.

The focus detection operated area setup subroutine called in step #108 above will be described below with reference to the flow chart shown in FIG. 9.

The computer PRS checks the current focus adjustment mode in step #201. If the servo AF mode is selected, the flow advances to step #203; if the one-shot AF mode is selected, the flow jumps to step #202. In step #203, the computer PRS checks the status of the flag REAF set in the main routine. If this flag is reset, since a focus detecting area is set for the first time from the power OFF state in which the power supply timer is not operative, the flow jumps to step #202.

In step #202, a focus detection operated area selected according to a rule "closest to the watched point" is set as a focus detecting area on the basis of the current watched point information, and the flow returns from this subroutine to the main routine. More specifically, when the focus detecting area is set for the first time, the focus detection operated area selected based on the current watched point information is set independently of the one-shot or servo AF mode.

If it is determined in step #203 that the flag REAF is set, since that flag indicates that the switch SW1 is turned on again during operation of the power supply timer, the flow advances to step #204 to check the relationship with the previous focus detecting area. In step #204, the positional relationship between the previous focus detection operated area and the current watched point is checked. As a result, if the previous area and the current watched point are not present at neighboring positions, the flow advances to step #202 described above, and a focus detecting area closest to the current watched point is set as the focus detection operated area.

Since a threshold value is appropriately set to have a value obtained by multiplying the length of a diagonal line of the photographing frame by a value ranging from 1/80 to 1/10, the threshold value is preferably set to fall within the range from 0.54 mm to 4.3 mm in a camera using a 135 mm film.

On the other hand, if the previous focus detection operated point is present in the neighborhood of the current watched point, the flow advances to step #205. The same focus detection operated area as the previous one is set as a focus detecting area, and the flow returns from this subroutine to the main routine.

Figure 10:
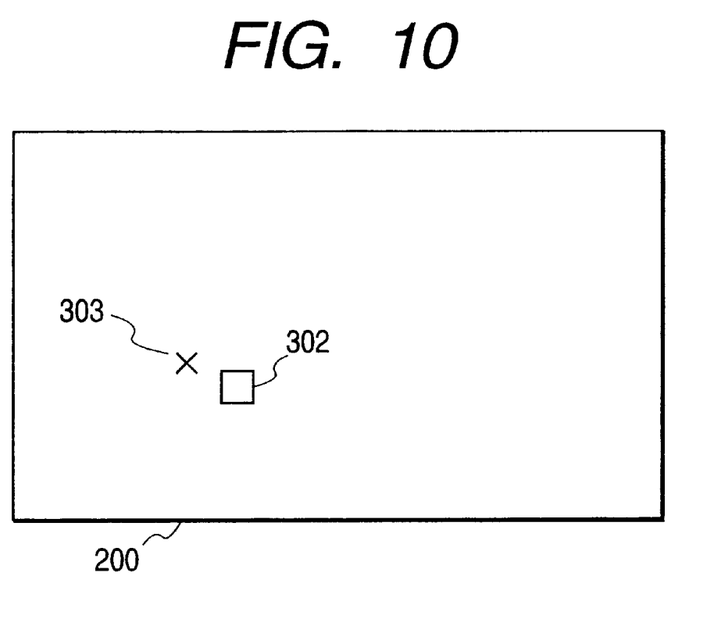
FIG. 10 is a view showing a focus detecting area displayed within the viewfinder to help explain the operation shown in FIG. 9.

FIG. 10 shows the relationship between a previous focus detecting area 202 and a coordinate position 203 of a line of sight as a result of the current line of sight detection.

Figure 9:
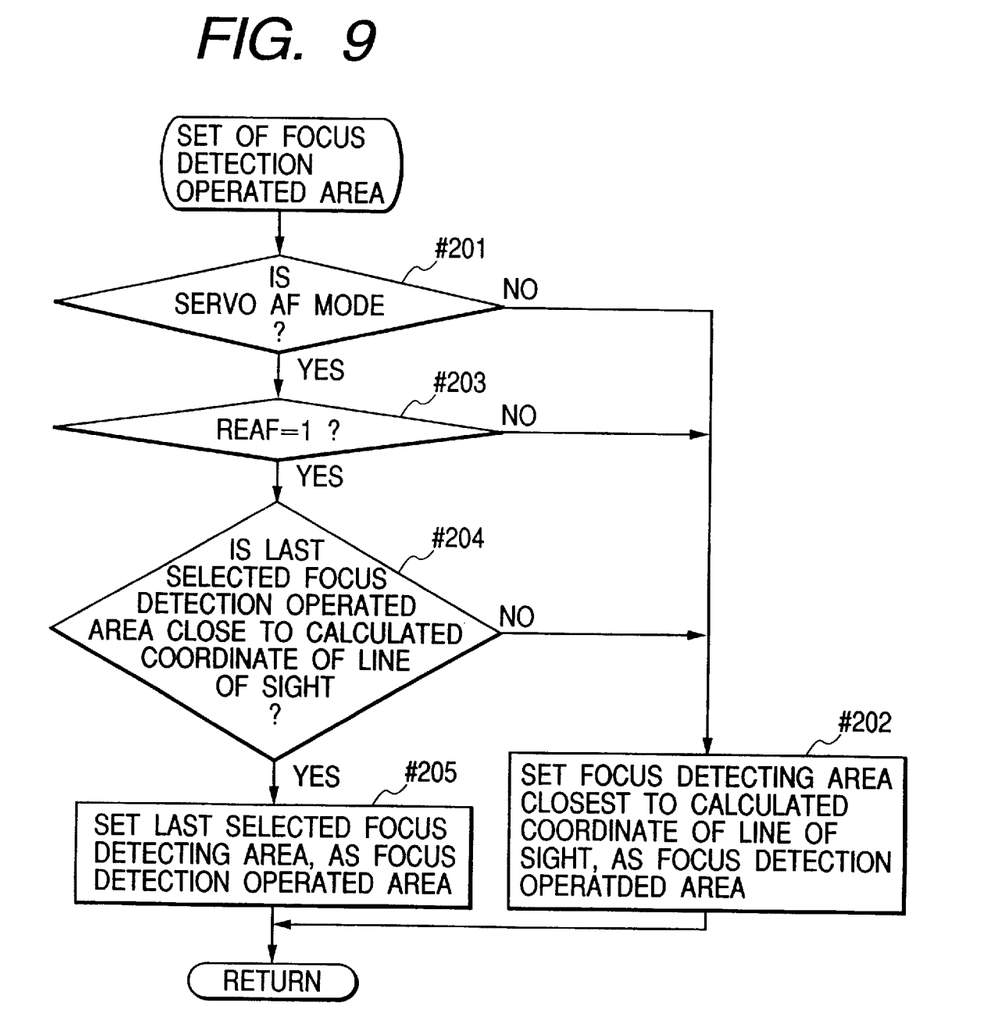
FIG. 9 is a flow chart showing focus detection operated area setup executed in step #108 in FIG. 6.
Figure 11:
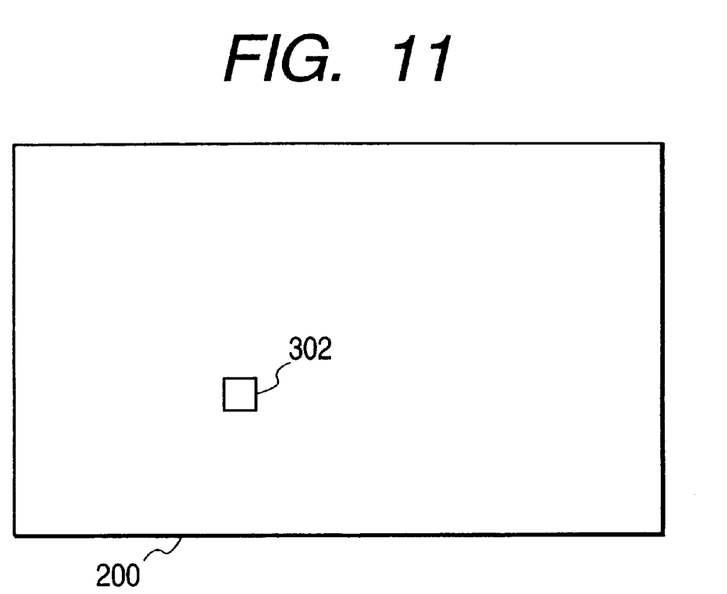
FIG. 11 is a view showing a focus detecting area displayed within the viewfinder to help explain the operation shown in FIG. 9.

In this case, since the previous area and the current watched point are present at neighboring positions, it is determined in step #204 in FIG. 9 that they are present at neighboring positions, and, in step #205, a focus detecting area corresponding to a display pattern 302 is maintained without shifting the focus detecting area position to that corresponding to a display pattern 306 or 307 shown in FIG. 3, as shown in FIG. 11.

This operation is based on the observation result of the following user's action.

In general, the user unconsciously observes the display pattern lighted in red and tends to adjust it to the object. Especially, such tendency is conspicuous upon photographing a moving object using servo AF. Hence, when the coordinate position of the line of sight is present in the vicinity of the already ON display pattern, it should be understood that an error is superposed on the line of sight detection result although the user is watching the display pattern, in place of assuming that the user starts new focus adjustment based on the line of sight by slightly offsetting the display pattern from the object. With this control, camera operation reflecting the user's will can be attained in most cases.

Figure 12:
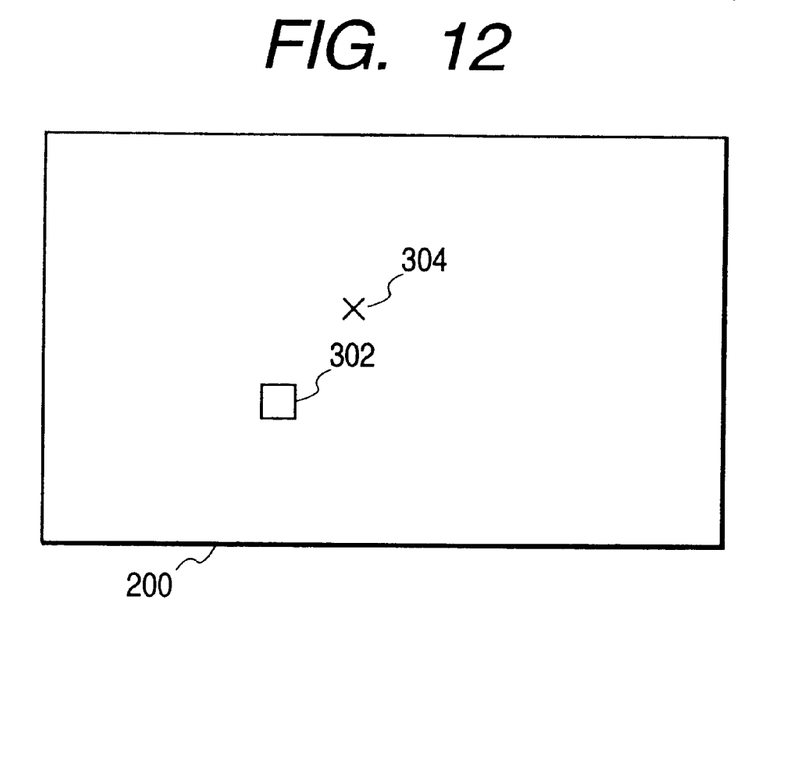
FIG. 12 is a view showing a focus detecting area displayed within the viewfinder to help explain the operation shown in FIG. 9.
Figure 13:
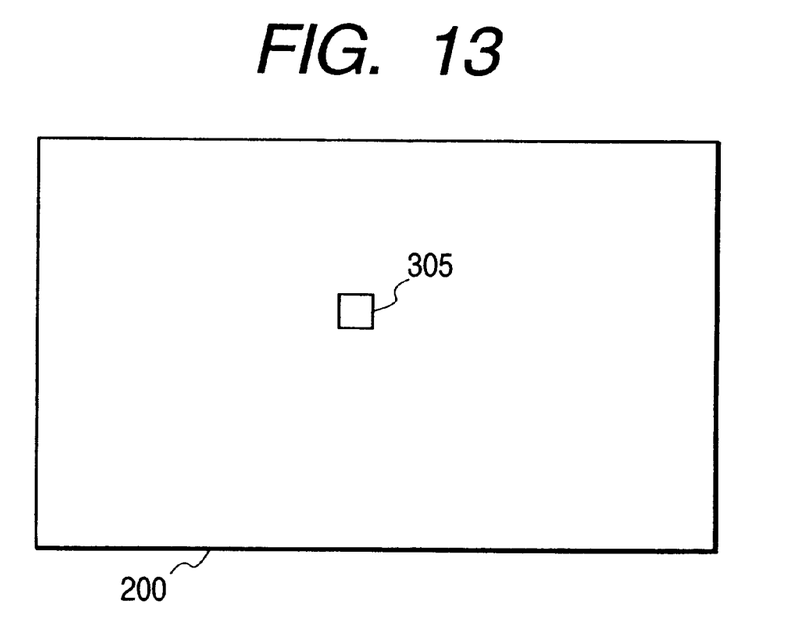
FIG. 13 is a view showing a focus detecting area displayed within the viewfinder to help explain the operation shown in FIG. 9.

FIG. 12 shows a case wherein the previous focus detection operated area 302 and a coordinate position 304 of a line of sight as the current line of sight detection result are not present at neighboring positions.

In this case, it is determined in step #204 in FIG. 9 that the previous area and the current watched point are not present at neighboring positions, and the flow advances to step #202. Hence, in this case, a focus detecting area corresponding to a display pattern 305 closest to this coordinate position 304 of the line of sight is selected, and focus adjustment is started based on focus information obtained here. Since the user is watching a position different from the displayed display pattern 302, a new focus detecting area is quickly used independently of the previous focus detection operated area.

Figure 14:
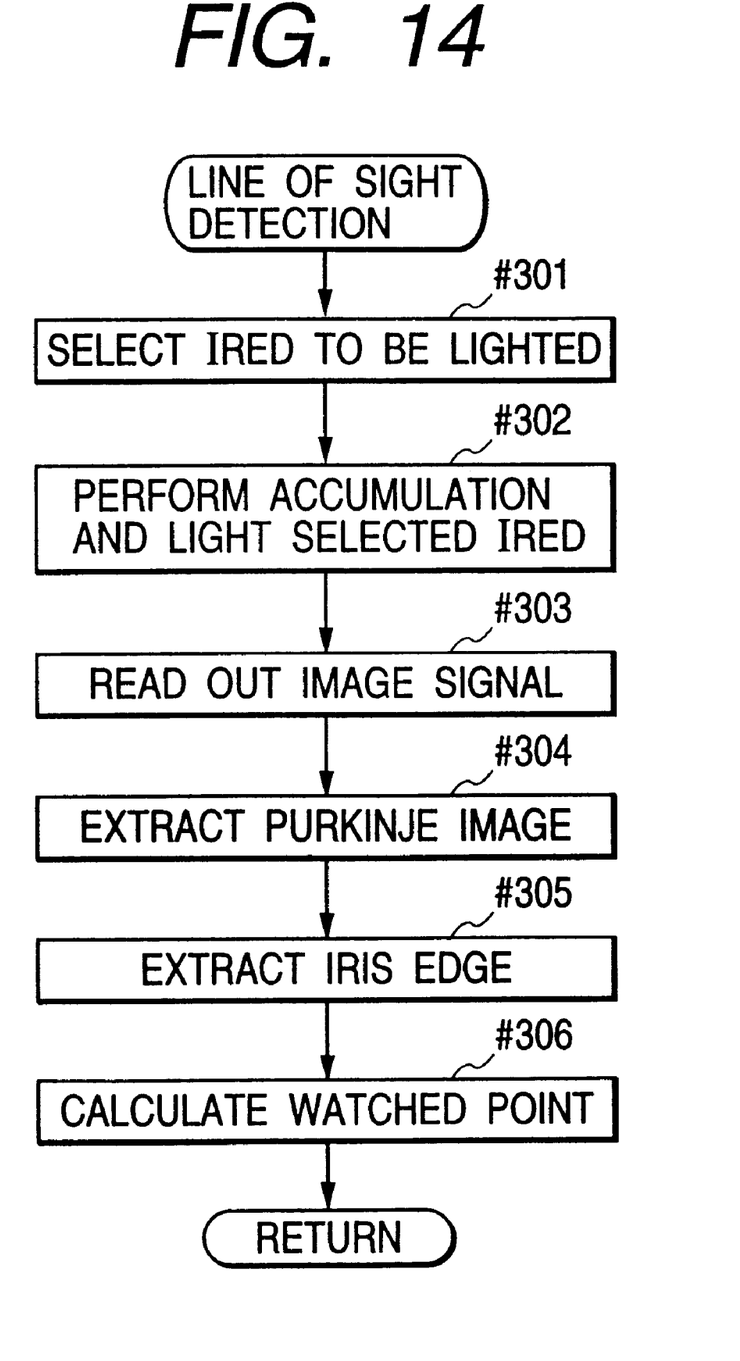
FIG. 14 is a flow chart showing line of sight detection executed in step #106 in FIG. 6.

FIG. 14 is a flow chart showing line of sight detection.

In step #301, the computer PRS initializes variables used in calculations and selects an IRED to be lighted from the IRED group. In step #302, the computer PRS clears charges on the area sensor SNS2 via the sensor driving circuit SDR2, and then starts accumulation. Also, the computer PRS lights the IRED selected in step #301. Subsequently, the computer PRS reads out an image signal of the area sensor SNS2 via the sensor driving circuit SDR2 in step #303.

In step #304, the computer PRS extracts a Purkinje image as a cornea reflected image of the IRED from the image signal, and stores the coordinate position of the Purkinje image on the sensor. In step #305, the computer PRS extracts iris edges from the image signal, and stores the coordinate position of the center between these iris edges on the sensor. Finally, the computer PRS determines the direction of line of sight from the coordinate position of the Purkinje image and the coordinate position of the center of the iris obtained in the previous steps in step #306. The flow then returns from this subroutine to the main routine.

According to the aforementioned embodiment, when the switch SW1 is turned on, a display pattern is lighted in the viewfinder on the basis of the output from the line of sight detecting device. When the switch SW1 is turned off, the display pattern is kept lighted for a predetermined period of time (which is determined based on the ON time of the switch SW1 but is not limited to such specific time). Hence, the user can adjust the display pattern to the position to be focused on the object during the predetermined period of time, and can press the release button while observing the display pattern, thus assuring reliable focus adjustment without deviating the focus detecting area from the position to be focused on the object. In other words, this can easily match (1) the position to be focused on the object, (2) watched point, and (3) focus detecting area described earlier in the prior art.

Furthermore, since the display pattern is turned off after an elapse of the predetermined period of time, limited power resources can be effectively used, and an active type superimpose display device can be used to display the display pattern.

When the switch SW1 is turned on, one of a plurality of focus detecting areas is selected based on the output from the line of sight detecting device. When the switch SW1 is turned off, and is turned on again before an elapse of the predetermined period, the current watched point position is compared with the position of a focus detecting area from which focal point information used in the previous focus adjustment was obtained, and if they are present at neighboring positions, the same focus detecting area as the previous one is set; if they are not present at neighboring positions, a focus detecting area closest to the current watched point position is set. Hence, even when the watched point detection result based on the eyeball movements is uncertain to some extent, (1) the position to be focused on the object, (2) watched point, and (3) focus detecting area can be easily matched with each other.

Therefore, when the user repeats the line of sight input while observing an identical position on the viewfinder, stability of the focus detecting area to be set can be improved very much. In this case, selection of a new focus detecting area is not disturbed.

As described above, with the arrangement of this embodiment, the line of sight input operation of the camera that reflects the user's will can be attained, and even in the servo AF mode that continuously adjusts the focus to the moving object, an important photographing chance can be prevented from missing due to a selection error of the focus detecting area based on the line of sight input.

(Modification)

In the above embodiment, the present invention is applied to a single-lens reflex camera. However, the present invention is not limited to such specific camera, but may be applied to various other cameras such as a video camera and the like, and other optical devices.

Also, the focus detecting areas for detecting an in-focus state have been exemplified as means for detecting information, but distance measurement areas for obtaining distance information (distance measurement information) may be used. Also, areas for obtaining photometry information may be used.

The display pattern is displayed in the viewfinder when the switch SW1 which is interlocked with the release button is turned on. Alternatively, a dedicated switch may be used.

What is claimed is:

1. An optical apparatus capable of line of sight detection, comprising:

a) line of sight detecting means for detecting a line of sight of a user who is watching a screen;

b) an operation member manually operated by the user; and c) display means for displaying at least one of a plurality of index marks set in the screen on the basis of an output from said line of sight detecting means, wherein said display means starts the displaying of said index mark in response to operation of said operation member, and maintains the displaying of said index mark even after the operation of said operation member is canceled.

2. An apparatus according to claim 1, wherein said display means has a timer, and stops the displaying of said index mark a predetermined period of time after the operation of said operation member is canceled.

3. A camera capable of line of sight detection, comprising:
a) line of sight detecting means for detecting a line of sight of a user who is watching a screen;
b) an operation member manually operated by the user; and
c) display means for selecting and displaying at least one of a plurality of index marks set in the screen on the basis of an output from said line of sight detecting means, wherein said display means starts the displaying of said index mark in response to operation of said operation member, and maintains the displaying of said index mark even after the operation of said operation member is canceled.

4. A camera according to claim 3, wherein said display means has a timer, and stops the displaying of said index mark a predetermined period of time after the operation of said operation member is canceled.

5. A camera according to claim 3, wherein said index mark is a focus detecting area.

6. A camera according to claim 3, wherein said index mark is a distance measurement area.

7. A camera according to claim 3, wherein said operation member is used for starting photographing.

8. A camera according to claim 3, wherein said display means superimposes said index mark in a viewfinder.

9. An optical apparatus capable of line of sight detection, comprising:
a) line of sight detecting means for detecting a line of sight of a user who is watching a screen;
b) an operation member manually operated by the user; and
c) selection means for selecting at least one of a plurality of index marks set in the screen on the basis of an output from said line of sight detecting means upon operation of said operation member, wherein when said operation member is operated again within a predetermined period of time after operation of said operation member is canceled, a line of sight position of said user is detected, the detected line of sight position is compared with a position of the index mark selected by said selection means, and when said line of sight position is in the vicinity of the index mark selected by said selection means, said selection means does not select a new index mark.

10. A camera capable of line of sight detection, comprising:
a) line of sight detecting means for detecting a line of sight of a user who is watching a screen;
b) an operation member manually operated by the user; and
c) selection means for selecting at least one of a plurality of index marks set in the screen on the basis of an output from said line of sight detecting means upon operation of said operation member, wherein when said operation member is operated again within a predetermined period of time after operation of said operation member is canceled, a line of sight position of said user is detected, the detected line of sight position is compared with a position of the index mark selected by said selection means, and when said line of sight position is in the vicinity of the index mark selected by said selection means, said selection means does not select a new index mark.

11. A camera according to claim 10, wherein said index mark is a focus detecting area.

12. A camera according to claim 10, wherein said index mark is a distance measurement area.

13. A camera according to claim 10, wherein a value determined based on a length of a diagonal line of a photographing screen is defined as a threshold value, and when a distance from said line of sight position to the index mark selected by said selection means falls within said threshold value, it is determined that said line of sight position is in the vicinity of the index mark selected by said selection means.

* * * * *